US012686592B2

(12) United States Patent
Sun et al.

(10) Patent No.: US 12,686,592 B2
(45) Date of Patent: Jul. 21, 2026

(54) METHOD AND APPARATUS FOR DETERMINING LEVELING FAULT OF ELEVATOR

(71) Applicant: SHENZHEN TECHNOLOGY UNIVERSITY, Shenzhen (CN)

(72) Inventors: Ruize Sun, Shenzhen (CN); Jianmin Cao, Shenzhen (CN); Xinan Wang, Shenzhen (CN); Lei Ning, Shenzhen (CN); Zhiqun Luo, Shenzhen (CN)

(73) Assignee: SHENZHEN TECHNOLOGY UNIVERSITY, Shenzhen (CN)

( * ) Notice: Subject to any disclaimer, the term of this patent is extended or adjusted under 35 U.S.C. 154(b) by 926 days.

(21) Appl. No.: 18/053,746

(22) Filed: Nov. 8, 2022

(65) Prior Publication Data

US 2023/0081901 A1 Mar. 16, 2023

Related U.S. Application Data

(63) Continuation of application No. PCT/CN2021/088768, filed on Apr. 21, 2021.

(51) Int. Cl.

*B66B 5/00* (2006.01)
*B66B 1/28* (2006.01)
*B66B 1/34* (2006.01)

(52) U.S. Cl.

CPC .............. *B66B 5/0018* (2013.01); *B66B 1/28* (2013.01); *B66B 1/3446* (2013.01)

(58) Field of Classification Search

CPC .......... B66B 5/018; B66B 1/28; B66B 1/3446

(Continued)

(56) References Cited

U.S. PATENT DOCUMENTS 3,584,706 A * 6/1971 Hall ........................ B66B 1/285 187/289
4,094,385 A * 6/1978 Maeda ...................... B66B 1/40 187/296

(Continued)

FOREIGN PATENT DOCUMENTS

CN 106882671 A * 6/2017 ............... B66B 5/02
CN 108249240 A * 7/2018 ........... B66B 5/0037

(Continued)

OTHER PUBLICATIONS

International Search Report of PCT Patent Application No. PCT/CN2021/088768 issued on Dec. 16, 2021.

*Primary Examiner* — Christina M Schreiber

(57) ABSTRACT

The present disclosure discloses a method and an apparatus for determining a leveling fault of an elevator. The method includes: acquiring a leveling signal and a target floor signal of an elevator, and determining whether the elevator is at a target floor according to the target floor signal; when yes, calculating a normal change sequence of signals of a leveling sensor of the elevator from a starting floor to the target floor; acquiring a real-time change sequence of the signals of the leveling sensor from the starting floor to the target floor; comparing whether the normal change sequence is the same as the real-time change sequence; and when the normal change sequence is the same as the real-time change sequence, determining that the elevator is normally leveled, and when the normal change sequence is different from the real-time change sequence, determining that the elevator has a leveling fault.

10 Claims, 4 Drawing Sheets

(58) Field of Classification Search
USPC ........................................................ 187/396
See application file for complete search history.

(56) References Cited

U.S. PATENT DOCUMENTS

| | | | | |
|---|---|---|---|---|
| 4,463,833 | A * | 8/1984 | Ludwig | B66B 1/3492 187/291 |
| 4,501,345 | A * | 2/1985 | Lowry | B66B 1/285 187/295 |
| 4,520,904 | A * | 6/1985 | Rado | B66B 1/405 187/291 |
| 4,785,914 | A * | 11/1988 | Blain | B66B 5/02 187/280 |
| 5,889,239 | A * | 3/1999 | Blackaby | B66B 1/30 187/394 |
| 2019/0344996 | A1* | 11/2019 | Son | B66B 1/50 |
| 2021/0221644 | A1* | 7/2021 | Cao | B66B 1/06 |
| 2021/0284493 | A1* | 9/2021 | Zhang | G08B 23/00 |
| 2022/0017329 | A1* | 1/2022 | Li | B66B 5/0031 |
| 2023/0081901 | A1* | 3/2023 | Sun | B66B 5/0018 187/396 |

FOREIGN PATENT DOCUMENTS

| | | | | |
|---|---|---|---|---|
| CN | 109911727 | A * | 6/2019 | |
| CN | 111362082 | A * | 7/2020 | B66B 5/0018 |
| CN | 114572787 | A * | 6/2022 | B66B 5/0031 |
| CN | 119263017 | A * | 1/2025 | B66B 13/165 |
| EP | 3569543 | A1 * | 11/2019 | B66B 1/28 |

* cited by examiner

METHOD AND APPARATUS FOR DETERMINING LEVELING FAULT OF ELEVATOR

CROSS REFERENCE OF RELATED APPLICATIONS

The present application is a Continuation Application of PCT Application No. PCT/CN2021/088768, filed on Apr. 21, 2021, the entire contents of which are hereby incorporated by reference.

TECHNICAL FIELD

The present disclosure relates to the technical field of elevators, and particularly to a method and an apparatus for determining a fault of an elevator.

BACKGROUND

In recent years, with a substantial increase in the usage of elevators and an increasing number of floors as well as a continuous increase in the service time of the elevators, faults of the elevators inevitably present an increasing trend. Among them, whether positions of elevator cars are determined correctly or not will not only affect the operation efficiency of the elevators, but may also cause a series of leveling faults. When the positions of the cars are acquired incorrectly, consequences are very serious in the event of accidents.

A traditional means for acquiring the positions of the elevator cars is described as follows: an actual rotation circumference of a traction sheave is calculated with a measurement signal of a floor encoder (a host side rotary encoder), and in this way, a movement distance of a wire rope and the positions of the cars are obtained. When the floor encoder determines that the positions of the cars are within a leveling range, a door will be opened to let people in. At present, the elevators generally rely on the floor encoder and a terminal inductor plate to comprehensively determine the positions of the elevator cars. With reference to FIG. 1, the terminal inductor plate generally includes a leveling sensor 1 and a leveling baffle 2, wherein the leveling sensor 1 is installed on the car and runs up and down with it; and the leveling baffle 2 is installed at a fixed position in an elevator shaft.

The leveling sensor 1 of the elevator generally includes a photoelectric induction type sensor and a magnetic induction type sensor, both of which are used to determine the position of the elevator through an induction signal between the leveling sensor 1 and the leveling baffle 2. The photoelectric induction type sensor commonly employed at present generally has two induction nodes, that is, an up induction node and a down induction node. When the two induction nodes detect the leveling baffle 2, the door of the elevator can be accurately aligned with an exit of the elevator, which is convenient for people to safely enter and exit.

However, the leveling fault may occur from time to time due to loss of the signals and displacement of the leveling baffle, which increases the occurrence rate of the accidents of the elevator.

SUMMARY

A main objective of the present disclosure is to provide a method and an apparatus for determining a leveling fault of an elevator, which aims to solve the problem that leveling fault in the prior art may occur from time to time due to loss of signals, displacement of a leveling baffle and the like, which increases the occurrence rate of accidents of the elevator.

In order to achieve the above objective, a first aspect of the present disclosure provides a method for determining a leveling fault of an elevator, including: acquiring a leveling signal and a target floor signal of the elevator, and determining whether the elevator is at a target floor according to the target floor signal; when yes, calculating a normal change sequence of signals of a leveling sensor of the elevator from a starting floor to the target floor, wherein a change in the signals of the leveling sensor includes non-induction signals, up induction signals, down induction signals and full-induction signals in a first direction and at rest, and the normal change sequence includes a first preset number of non-induction signals, up induction signals, down induction signals and first full-induction signals in the first direction and one full-induction signal at rest, wherein the first preset number is the number of floors between the starting floor and the target floor, and the first direction is an up direction or a down direction of the elevator; acquiring a real-time change sequence of the signals of the leveling sensor from the starting floor to the target floor; comparing whether the normal change sequence is the same as the real-time change sequence; and when the normal change sequence is the same as the real-time change sequence, determining that the elevator is normally leveled, and when the normal change sequence is different from the real-time change sequence, determining that the elevator has a leveling fault.

In some embodiments, the method further includes: after acquiring the leveling signal, when a current floor where the elevator is located is not the target floor, determining whether a second preset number of the up induction signals, the first full-induction signals and the down induction signals in the same direction exist within the change sequence of the signals of the leveling sensor between the starting floor and the current floor, wherein the second preset number is the number of floors between the starting floor and the current floor; when yes, determining that the leveling sensor fails or a leveling baffle falls off; and when not, continuing to acquire the leveling signal.

In some embodiments, after determining that the elevator has the leveling fault, the method further includes: determining whether the first preset number of the up induction signals and the full-induction signals in the first direction and one full-induction signal at rest exist within the real-time change sequence; and when yes, determining that the leveling fault is a leveling non-stop fault.

In some embodiments, after determining that the elevator has the leveling fault, the method further includes: determining whether more than the first preset number of the down induction signals and the first full-induction signals in the first direction exist within the real-time change sequence, whether down induction signals at rest exist within the real-time change sequence, and whether full-induction signals in a direction opposite to the first direction exist within the real-time change sequence; and when all are yes, determining that the leveling fault is a leveling dislocation fault.

In some embodiments, after determining that the elevator has the leveling fault, the method further includes: determining whether the up induction signals in the first direction in the real-time change sequence are adjacent to the down induction signals; when yes, determining whether the up induction signals and the down induction signals reciprocate; and when yes, determining that the leveling fault is a leveling-unable fault of an up-down cyclical movement of the elevator at the target floor.

In some embodiments, after determining that the elevator has the leveling fault, the method further includes: determining in the real-time change sequence minus the signal of the leveling sensor of the target floor, whether the up induction signals and the down induction signals in the first direction have a combination that they are adjacent; and when yes, determining that the leveling-unable fault of the up-down cyclical movement of the elevator exists in the floor represented by the combination that the up induction signal and the down induction signal are adjacent.

In some embodiments, after determining that the elevator has the leveling fault, the method further includes: generating alarm information, and sending the alarm information to a receiving terminal of the elevator maintenance personnel.

A second aspect of the present disclosure provides an apparatus for determining a leveling fault of an elevator, including a data acquirer, configured to acquire a leveling signal and a target floor signal of the elevator; a determining and calculating module, configured to determine whether the elevator is at a target floor, and when yes, calculate a normal change sequence of signals of a leveling sensor of the elevator from a starting floor to the target floor; an acquiring module, configured to acquire a real-time change sequence of the signals of the leveling sensor from the starting floor to the target floor; a comparing module, configured to compare whether the normal change sequence is the same as the real-time change sequence; and a determining module, configured to determine that the elevator is normally leveled when the normal change sequence is the same as the real-time change sequence, and determine that the elevator has a leveling fault when the normal change sequence is different from the real-time change sequence.

In some embodiments, the data acquirer includes a controller area network transceiver, a single-chip microcomputer and a narrowband Internet of Things module, wherein the controller area network transceiver is electrically connected with an elevator controller, and configured to acquire a leveling signal and signals of a leveling sensor from a serial port of the elevator controller, wherein the serial port is a controller area network bus; the single-chip microcomputer is electrically connected with the controller area network transceiver, and configured to acquire the leveling signal and the signals of the leveling sensor from the controller area network transceiver; and the narrowband Internet of Things module is electrically connected with the single-chip microcomputer, and configured to acquire the leveling signal and the signals of the leveling sensor from the single-chip microcomputer and send the leveling signal and the signals of the leveling sensor to a predetermined terminal.

In some embodiments, the data acquirer further includes a power management module electrically connected with the controller area network transceiver, the single-chip microcomputer and the narrow-band Internet of Things module; a backup power supply electrically connected with the power management module; and a photoelectric isolator having two ends respectively connected with the controller area network transceiver and the serial port of the elevator.

The method and the apparatus for determining the fault of the elevator provided by the present disclosure have the beneficial effects that: when the elevator runs or passes through the faulty floor, the signals of the leveling sensor may abnormally change correspondingly. Therefore, the fault may be determined or predicted by analyzing the real-time change sequence of the signals of the leveling sensor of the elevator. Maintenance can be made in advance to prevent passengers from being influenced by the fault, such that the elevator maintenance personnel can maintain the elevator in time. In this way, the probability of accidents of the elevator is reduced.

BRIEF DESCRIPTION OF THE DRAWINGS

In order to explain embodiments of the present disclosure or technical solutions in the prior art more clearly, the following briefly introduces accompanying drawings that need to be used in the description of the embodiments or the prior art. Obviously, the accompanying drawings in the following description are only some embodiments of the present disclosure. Those skilled in the art can obtain other accompanying drawings according to these accompanying drawings without paying any creative efforts.

DESCRIPTION OF THE EMBODIMENTS

In order to make the objective, features and advantages of the present disclosure more obvious and understandable, technical solutions in embodiments of the present disclosure will be clearly and completely described below with reference to accompanying drawings in the embodiments of the present disclosure. The embodiments described above are only a part of the embodiments of the present disclosure, but not all of the embodiments. Based on the embodiments of the present disclosure, all other embodiments obtained by those skilled in the art without paying any creative efforts shall fall within the protective scope of the present disclosure.

Figure 1:
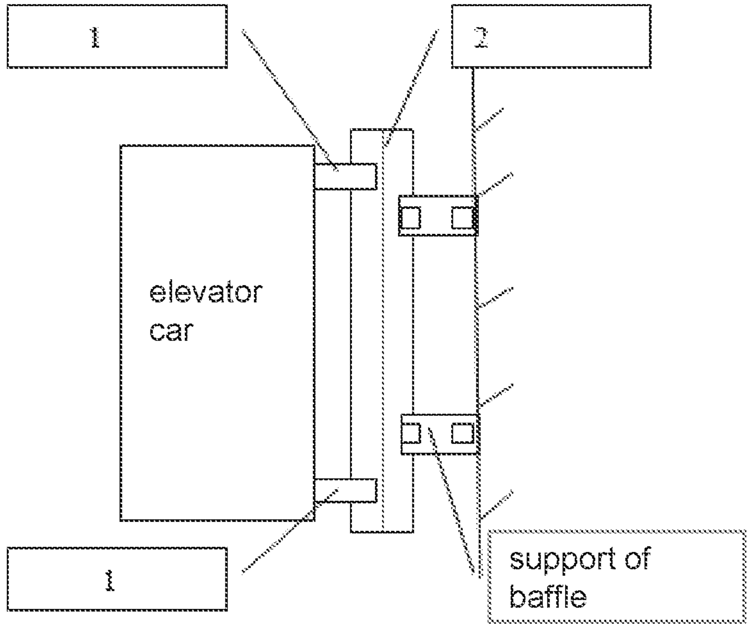
Prior Art FIG. 1
FIG. 1 is a schematic diagram of installing a leveling sensor and a leveling baffle of an elevator in the prior art.
Figure 2:
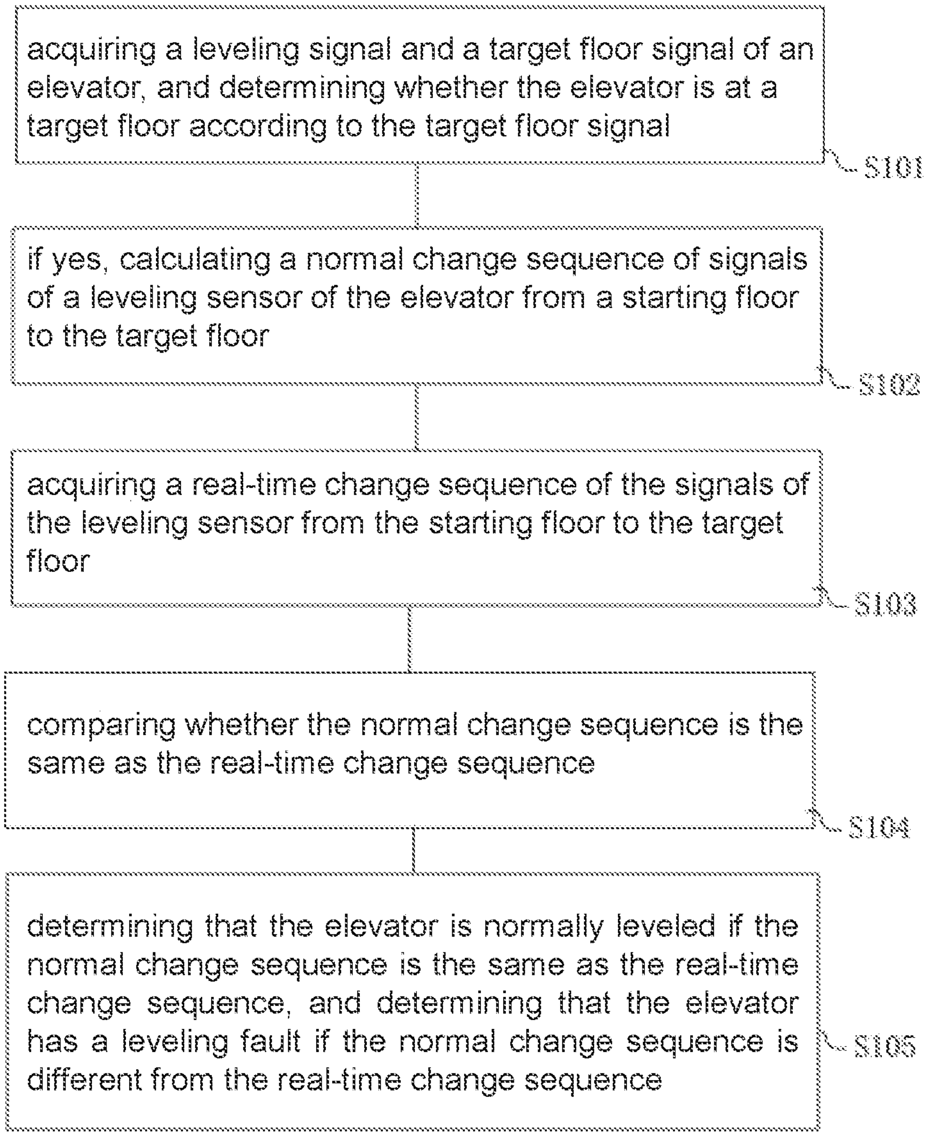
FIG. 2 is a schematic flowchart of a method for determining a fault of an elevator according to an embodiment of the present disclosure.

Reference is made to FIG. 2, which is a method for determining a leveling fault of an elevator, including:

S101, acquiring a leveling signal and a target floor signal of the elevator, and determining whether the elevator is at a target floor according to the target floor signal;

S102, if yes, calculating a normal change sequence of signals of the leveling sensor of the elevator from a starting floor to the target floor;

S103, acquiring a real-time change sequence of the signals of the leveling sensor from the starting floor to the target floor;

S104, comparing whether the normal change sequence is the same as the real-time change sequence; and

S105, if the normal change sequence is the same as the real-time change sequence, determining that the elevator is normally leveled, and if the normal change sequence is different from the real-time change sequence, determining that the elevator has a leveling fault.

In this embodiment, a change in the signals of the leveling sensor includes non-induction signals, up induction signals, down induction signals and first full-induction signals in a first direction and at rest; and the normal change sequence includes a first preset number of non-induction signals, up induction signals, down induction signals and first full-induction signals in the first direction and one full-induction signal at rest, wherein the first preset number is the number of floors between the starting floor and the target floor, and the first direction is an up direction or a down direction of the elevator.

Specifically, the above-mentioned signals are included in a 7th bit of a leveling frame (a data frame starting with 00 01). Specific formats of these signals are different according to an up/down state of the elevator. A correspondence relationship between the signals of the leveling sensor of the elevator and a running state of the elevator is shown in Table 1.

TABLE 1

Correspondence relationship table between signals of leveling sensor and running state of elevator

| Elevator/ leveling sensor | Non-induction | Down induction | Up induction | Full induction |
|---|---|---|---|---|
| Rest | 00 | 04 | 08 | 0C |
| Up | 01 | 05 | 09 | 0D |
| Down | 02 | 06 | 0A | 0E |

When the elevator runs or passes through the faulty floor, the signals of the leveling sensor will abnormally change correspondingly. Therefore, the fault may be determined or predicted by analyzing the real-time change sequence of the signals of the leveling sensor of the elevator. The maintenance may be made in advance to prevent passengers from being influenced by the fault, such that the elevator maintenance personnel can maintain the elevator in time. In this way, the probability of accidents of the elevator is reduced.

Now, the number of floors of a building with the elevator is increasingly grown, such as the number of floors of buildings with elevators in residential zones are often greater than 30. An elevator controller is connected with an elevator operation panel by generally adopting a serial transmission method, such as a Canbus interface. In the present disclosure, running data is extracted from a serial port of the elevator controller and the operation panel (signal processing board).

In this embodiment, a target floor signal is generally sent by the elevator operation panel to the elevator controller, and generally represents the target floor in the form of bits. For example, 01 indicates that a call from a first floor is made, 02 indicates that a call from a second floor is made, and 03 indicates that calls from the first floor and the second floor are made simultaneously.

A leveling signal is sent by the elevator operation panel to the elevator controller, indicating that the elevator has reached a certain floor. An elevator floor encoder will automatically calculate the number of leveling signals, calculate a position (floor) in which the elevator is located, and send a floor number back to the elevator operation panel to prompt a user.

Signals of the leveling sensor are sent by the elevator operation panel to the elevator controller, indicating an induction relationship between the leveling sensor and the baffle. The signals of the leveling sensor include up induction signals, that is, an up induction node of a leveling sensor induces a leveling baffle, such that the up induction signals are set. Similarly, the signals of the leveling sensor further include down induction signals, full induction signals, and non-induction signals.

In the present disclosure, a data acquirer is utilized, and is directly connected to the serial port of the elevator to acquire the target floor signal, the leveling signal and the signals of the leveling sensor of the elevator. These signals may be combined to determine related faults.

For example, since in a normal state, the first direction of the elevator is an up direction, the starting floor is the first floor, and the target floor is the second floor, the elevator is in a normal up state, and according to a code in Table 1, a normal variation in the signals of the leveling sensor of the elevator is shown in Table 2.

TABLE 2 change in signals of the leveling sensor of target floor (second floor) when elevator is in normal state

| 7th bit of 0001 data frame | Meaning represented by 7th bit | Corresponding running state of elevator |
|---|---|---|
| 01 | Up and non-induction | the elevator enters a range of the second floor, but has not touched the leveling baffle of the second floor |
| 09 | Up and up induction | An up sensor starts to touch the leveling baffle of the second floor |
| 0D | Up and full induction | The sensor is in a full-induction state, and is still in an up state |
| 0C | Rest and full induction | The elevator is normally leveled at rest |

Therefore, in a process from the first floor to the second floor, a normal change sequence of the 7th digit of the signals of the leveling sensor is 01-09-0D-0C. If it is not the same as the normal change sequence, it means that a certain link is faulty, such that it is determined that the elevator has a leveling fault at this time.

In one embodiment, the method for determining a leveling fault of the elevator further includes: after acquiring the leveling signal, if a current floor where the elevator is located is not the target floor, determining whether a second preset number of the up induction signals, the first full-induction signals and the down induction signals in the same direction exist within the change sequence of the signals of the leveling sensor between the starting floor and the current floor, wherein the second preset number is the number of floors between the starting floor and the current floor; if yes, determining that the leveling sensor fails or the leveling baffle falls off; and if not, continuing to acquire the leveling signal.

By way of an example of using the target floor as the third floor and the starting floor as the first floor, according to data in Table 1, the change in the signals of the leveling sensor when passing through the second floor in the normal state is shown in Table 3.

TABLE 3 change in signals of leveling sensor passing through floor (second floor) when elevator is in normal state

| 7th bit of 0001 data frame | Meaning represented by 7th bit | Corresponding running state of elevator |
|---|---|---|
| 01 | Up and non-induction | The elevator enters a range of the second floor, but has not touched the leveling baffle of the second floor |

TABLE 3-continued

| change in signals of leveling sensor passing through floor (second floor) when elevator is in normal state | | |
|---|---|---|
| 7th bit of 0001 data frame | Meaning represented by 7th bit | Corresponding running state of elevator |
| 09 | Up and up induction | An up sensor starts to touch the leveling baffle of the second floor |
| 0D | Up and full induction | The sensor is in a full-induction state, and is still in an up state |
| 05 | Up and down induction | The elevator continues to go upwards, an up leveling sensor leaves the baffle, and a down leveling sensor still induces the baffle |
| 01 | Up and non-induction | The leveling sensor completely leaves the leveling baffle of the second floor |

When the baffle of the second floor falls off or the sensor fails to induce, the 7th digit of a leveling frame will become 01 (up and non-induction), and "09", "0D" and "05" are missing. However, because the second floor is not the target floor, the elevator still goes up normally. In this embodiment, the data of the leveling sensor may be received in a data center. After receiving the data of the leveling sensor, the data center can monitor the data of the leveling sensor in real time. Once the signals are abnormal, the maintenance personnel may be prompted in time to perform intervention in advance.

For a traditional leveling fault, relevant data may only be obtained when the elevator runs to the faulty floor. That is, passengers may only know that the elevator fails after being influenced by the leveling fault. However, in the embodiment of the present disclosure, the data of the second floor will be found in real time once it is abnormal as described above. Moreover, the fault of the sensor may be determined and warned in advance only when the elevator passes through the floor. Now, the number of the floors is increasingly grown. For example, the number of the floors of most of buildings in the residential zone is greater than 30. By way of an example of the number of the floors of 30, the probability that the faulty floor is just the target floor is only about 3%, while the probability of about 97% may be found in advance. Moreover, the maintenance personnel may be prompted by an early warning mechanism in advance to perform intervention. Accordingly, related faults that the passengers are influenced by the fault of the sensor are avoided with a great probability.

In one embodiment, after determining that the elevator has the leveling fault, the method further includes: determining whether the first preset number of the up induction signals and the full-induction signals in the first direction and one full-induction signal at rest exist within the real-time change sequence; and if yes, determining that the leveling fault is a leveling non-stop fault.

Still by way of an example of using the first direction of the elevator as the up direction, the starting floor as the first floor, and the target floor as the second floor, if the elevator has a non-stop fault, the seventh digit of the signals of the leveling sensor does not change, which is 01 in Table 2. "09", "0D" and "0C" are missing. Accordingly, it may be determined that the elevator has the non-stop fault, and the data is transmitted to a data center of a monitoring system in real time through a data acquiring board. The fault may be determined according to the missing of the signals once the leveling non-stop failure occurs.

After determining that the elevator has the leveling fault, the method further includes: determining whether more than the first preset number of the down induction signals and the first full-induction signals in the first direction exist within the real-time change sequence, whether down induction signals at rest exist within the real-time change sequence, and whether full-induction signals in a direction opposite to the first direction exist within the real-time change sequence; and if all are yes, determining that the leveling fault is a leveling dislocation fault.

During the actual use of the elevator, if the leveling baffle is dislocated due to loosening of screws or other reasons, the leveling baffle will usually move downwards relative to a normal position due to an action of gravity. When the elevator runs to a normal leveling position, because the leveling baffle moves downwards, the leveling sensor is in a down induction state instead of a full induction state, the door of the elevator will not be opened, but the elevator continues to go down to find the full induction state of the leveling sensor. After the leveling sensor is in the full induction state, an inner door of the elevator is opened. However, since the inner door has deviated from the leveling range at this time, the floor encoder determines that the elevator is in a non-leveling state, and an outer door of the elevator will remain closed and will be powered off. At this time, a leveling dislocation fault occurs.

Still by way of an example of using the first direction of the elevator as the up direction, the starting floor as the first floor, and the target floor as the second floor, according to codes in Table 1, a normal change in the signals of the leveling sensor of the elevator under a normal condition is shown in Table 2. It shows that when the leveling baffle of the second floor moves downwards, a leveling dislocation fault occurs, and a change in the signals of the leveling sensor is shown in Table 4.

TABLE 4

| change in signals of leveling sensor of target floor (second floor) when elevator has leveling dislocation fault | | |
|---|---|---|
| 7th bit of 0001 data frame | Meaning represented by 7th bit | Corresponding running state of elevator |
| 09 | Up and up induction | An up sensor starts to touch the leveling baffle of the second floor |
| 0D | Up and full induction | The sensor is in a full induction state, and is still in an up state |
| 05 | Up and down induction | The elevator continues to go upwards, an up leveling sensor leaves the baffle, and a down leveling sensor still induces the baffle |
| 04 | Rest and down induction | The elevator stops for a short time |
| 06 | Down and down induction | After a short stop, the elevator runs again and goes downwards to find the full induction state |
| 0E | Down and full induction | The sensor fully induces the baffle and is still in a down state |
| C0 | Rest and full induction | The elevator finishes going downwards and the door (inner door) of the elevator is opened at rest |

It can be seen that: when the elevator has a non-leveling door opening fault due to a downward movement of the leveling baffle, compared with a normal 00 01 data frame "09--0D--0C", this change rule "09--0D--05--04--06--0E--0C" will occur. Extra 05-04-0D--0E data may be in one-to-one correspondence to meanings shown in Table 1. Also, due to the fault of a leveling error, the inner door of the elevator is opened and the outer door is kept closed. If passengers exist inside the elevator, a trapping incident will be caused.

The signals of the leveling sensor are transmitted back to the data center of the monitoring system in real time, and the leveling dislocation fault of the elevator may be determined according to a sequence of its change rule, and maintenance made be made in time, which may reduce the occurrence rate of the trapping incident of the elevator.

In one embodiment, after determining that the elevator has the leveling fault, the method further includes: determining whether the up induction signals are adjacent to the down induction signals in the first direction in the real-time change sequence; if yes, determining whether the up induction signals and the down induction signals reciprocate; and if yes, determining that the leveling fault is a leveling-unable fault of an up-down cyclical movement of the elevator at the target floor.

During the actual operation of the elevator, the door of the elevator will be opened when the leveling sensor finds the full induction state. However, if the leveling baffle becomes shorter due to corrosion, fracture, and the like, the length is less than the distance between an up induction node and a down induction node of the leveling sensor, the sensor will not be able to reach the full induction state. At this time, the leveling-unable fault of an "up-down cyclic movement" will occur.

Still by way of an example of using the first direction of the elevator as the up direction, the starting floor as the first floor, and the target floor as the second floor, if the leveling-unable fault of an "up-down cyclic movement" occurs in the second floor, a running condition of the elevator from the first floor to the second floor is described as follows: the up leveling sensor of the elevator continues to go up normally after inducing the baffle, until the down leveling sensor induces the baffle, but at this time the up leveling sensor does not induce the baffle any more. After a short stop, the elevator goes down to find the full induction state. The elevator goes down until the up leveling sensor induces the baffle, and the down leveling sensor does not induce the baffle any more. After a short stop, the elevator goes up. This cycle repeats to find the leveling full induction state of the sensor. At this time, a change in a signal of the leveling sensor of the second floor is shown in Table 5.

TABLE 5 change in signal of leveling sensor of target floor (second floor) when elevator has leveling-unable fault

| 7th bit of 0001 data frame | Meaning represented by 7th bit | Corresponding running state of elevator |
|---|---|---|
| 01 | Up and non-induction | The elevator enters a range of the second floor, but has not touched the leveling baffle of the second floor |
| 09 | Up and up induction | An up sensor starts to touch the leveling baffle of the second floor |
| 05 | Up and down induction | The elevator continues to go up, an up leveling sensor leaves the baffle, and a down leveling sensor induces the baffle |
| 04 | Rest and down induction | The elevator is at rest for a short time, and the down leveling sensor induces the baffle |
| 06 | Down and down induction | After a short rest, the elevator goes downwards to find the full induction state |
| 0A | Down and up induction | The elevator goes downwards, the down leveling sensor leaves the baffle, the up leveling sensor induces the baffle |
| . . . | . . . | . . . |

Such a phenomenon is not common in reality, but once it occurs, the elevator will move cyclically up and down near the leveling range of the faulty floor and the door is not opened, which will cause serious physical and mental harm to passengers. Moreover, since finding the full induction state is a normal operation logic of the elevator, the elevator will not actively determine the fault. However, the leveling-unable fault may be monitored according to the abnormal leveling signal: full induction "0D" is missing between up induction "09" and down induction "05" of the leveling sensor, and the cycle repeats. Once the monitoring system finds such an abnormality, the leveling-unable fault may be determined and alarmed, such that the leveling-unable fault is removed in time.

In one embodiment, after determining that the elevator has the leveling fault, the method further includes: determining that in the real-time change sequence minus the signals of the leveling sensor of the target floor, the up induction signals and the down induction signals in the first direction have a combination that they are adjacent; and if yes, determining that the leveling-unable fault of the up-down cyclical movement occurs in the floor represented by the combination that the up induction signal and the down induction signal are adjacent.

By way of an example of using the first direction of the elevator as the up direction, the starting floor as the first floor, and the target floor as the third floor, if the leveling-unable fault of the "up-down cyclic movement" occurs in the second floor, that is, when the passengers are carried from the first floor to the third floor (or higher floor) through the second floor, a change in the signal of the leveling sensor is shown in Table 6.

TABLE 6 change in signal of leveling sensor after passing through floor (second floor) when elevator has leveling-unable fault

| 7th bit of 0001 data frame | Meaning represented by 7th bit | Corresponding running state of elevator |
|---|---|---|
| 01 | Up and non-induction | The elevator enters a range of the second floor, but has not touched the leveling baffle of the second floor |
| 09 | Up and up induction | An up sensor starts to touch the leveling baffle of the second floor |
| 05 | Up and down induction | The elevator continues to go upwards, an up leveling sensor leaves the baffle, and a down leveling sensor still induces the baffle |
| 01 | Up and non-induction | The leveling sensor completely leaves the leveling baffle of the second floor |

Compared with the change in the signal of the leveling sensor passing through the floor (second floor) in the normal state of Table 3, it may be found that full induction "0D" is missing between the up induction "09" and the down induction "05" of the leveling sensor. Once the monitoring system finds such anomalies in the data, the fault may be predicted, and the maintenance personnel is prompted to perform intervention in advance, such that the leveling-unable fault may be removed in time.

In one embodiment, after determining that the elevator has the leveling fault, the method further includes: generating alarm information, and sending the alarm information to a receiving terminal of the elevator maintenance personnel.

Sending the alarm information to the receiving terminal of the elevator maintenance personnel enables the maintenance personnel to receive information about the fault of the elevator at the first time, so as to remove the fault of the elevator at the first time. In this way, the occurrence rate of accidents of the elevator is reduced.

In one embodiment, the method for determining the leveling fault of the elevator is to determine the fault of the leveling sensor or the falling off of the leveling baffle, the leveling non-stop fault, the leveling dislocation fault and the leveling-unable fault. At the beginning, the running condition of the elevator is performed to determine whether the first direction of the elevator is the up direction or the down direction. In this embodiment, the up direction is taken as an example.

After the leveling signal is acquired, it is determined whether the elevator has reached the target floor. If the elevator has reached the target floor, it is determined whether the leveling sensor fails or the leveling baffle falls off. If the leveling sensor fails or the leveling baffle falls off, it is determined whether the leveling sensor of the elevator fails or the leveling baffle of an elevator shaft falls off. If the leveling sensor of the elevator fails or the leveling baffle of an elevator shaft falls off, the leveling signal is continuously acquired.

After the leveling signal is acquired, if the elevator reaches the target floor, it is firstly determined whether the leveling sensor is in a leveling non-stop state, and then the leveling dislocation fault and the leveling-unable fault are sequentially determined.

In this embodiment, no matter what type of elevator it is or which manufacturer's elevator, modern elevators have a data interface between an operation panel/an outer call panel and the controller. In order to enable long-distance transmission, a Canbus interface is generally employed, and both floor signals and outer call signals need to be exchanged, which provides the convenience for centralized monitoring of floor selection monitoring of the elevator. A monitoring system interface is easily unified by analyzing the Canbus data in advance.

Since the signals of the leveling sensor are acquired through the serial port of the elevator, when the elevator runs to the faulty floor, the signals of the leveling sensor may abnormally change correspondingly, such that different types of leveling faults may be determined. In addition, when the faulty floor is used as a by-pass floor, the leveling non-stop" fault and the leveling-unable fault of the "up-down cyclic movement" will cause the loss of the signals of the leveling sensor, so as to predict the fault and perform the intervention in advance.

Because the signal of the elevator is acquired through the serial port of the elevator, that is, the running data of the elevator is acquired actually, and the system itself logically combines the leveling non-stop fault, the leveling dislocation fault, the squatting/topping fault and the "up-down cyclic movement" fault and no fault signal is hidden by the manufacturer, the success rate of determining the fault is high, and the accuracy is achieved.

Because a large number of sensors are not used to collect fault data of the elevator, but the data of the elevator is collected at the Canbus interface of the elevator system, and the data is wirelessly transmitted through a NBIOT network, the elevator system not only has low construction cost, but also is easy to install, which is beneficial to the popularization and use.

The present disclosure provides an apparatus for determining a leveling fault of an elevator, including a data acquirer, configured to acquire a leveling signal and a target floor signal of an elevator; a determining and calculating module, configured to determine whether the elevator is at a target floor, and if yes, calculate a normal change sequence of signals of a leveling sensor of the elevator from a starting floor to the target floor; an acquiring module, configured to acquire a real-time change sequence of the signals of the leveling sensor from the starting floor to the target floor; a comparing module, configured to compare whether the normal change sequence is the same as the real-time change sequence; and a determining module, configured to determine that the elevator is normally leveled if the normal change sequence is the same as the real-time change sequence, and determine that the elevator has a leveling fault if the normal change sequence is different from the real-time change sequence.

In the present disclosure, the signals of the elevator are acquired from an operation panel in the elevator and a Canbus interface of an elevator controller, wherein the signals include up induction signals and down induction signals of the leveling sensor, as well as basic signals such as the leveling signal and the target floor signal, and the running state of the elevator and a series of related failures of the sensor the elevator are determined by logic analysis. Because the signals of the elevator are acquired from the Canbus interface of the elevator, the interface is unified, the interface is not limited by different manufacturers and models and has the advantages of easy popularization and "uniformity", and when the elevator runs or passes through the faulty floor, the signals of the leveling sensor will abnormally change correspondingly, the fault may be determined or predicted by analyzing the elevator signals of the leveling sensor, and the maintenance is performed in advance to prevent passengers from being influenced by the fault. The signals are actually monitored through the Canbus interface, and the fault is determined by logical combination analysis, which solves the possibility of the manufacturer deliberately concealing some faults. Accordingly, the advantage of high "accuracy" is achieved. Meanwhile, a monitoring device may be connected to one node of the Canbus interface of the elevator without adding additional sensors in the elevator shaft. Accordingly, the advantages of simple installation, low cost and "economical efficiency" are achieved.

Figure 3:
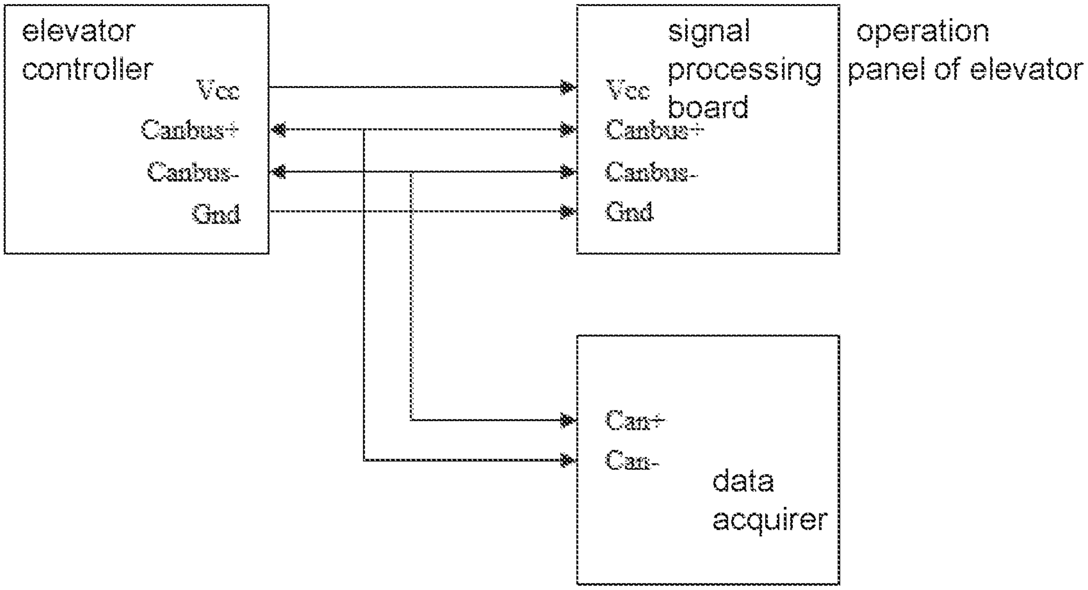
FIG. 3 is a schematic diagram of connecting a data acquirer of an apparatus for determining a fault of an elevator with an elevator controller according to an embodiment of the present disclosure.

In this embodiment, the running data is extracted from the serial interface of the elevator controller and the operation panel (signal processing board), and the specific connection of the data acquirer is shown in FIG. 3. In addition to the power supply and ground (Vcc and Gnd), the Canbus bus has two data lines, that is, Canbus+ and Canbus−, which transmit signals in a differential manner and may transmit data in both directions.

Figure 4:
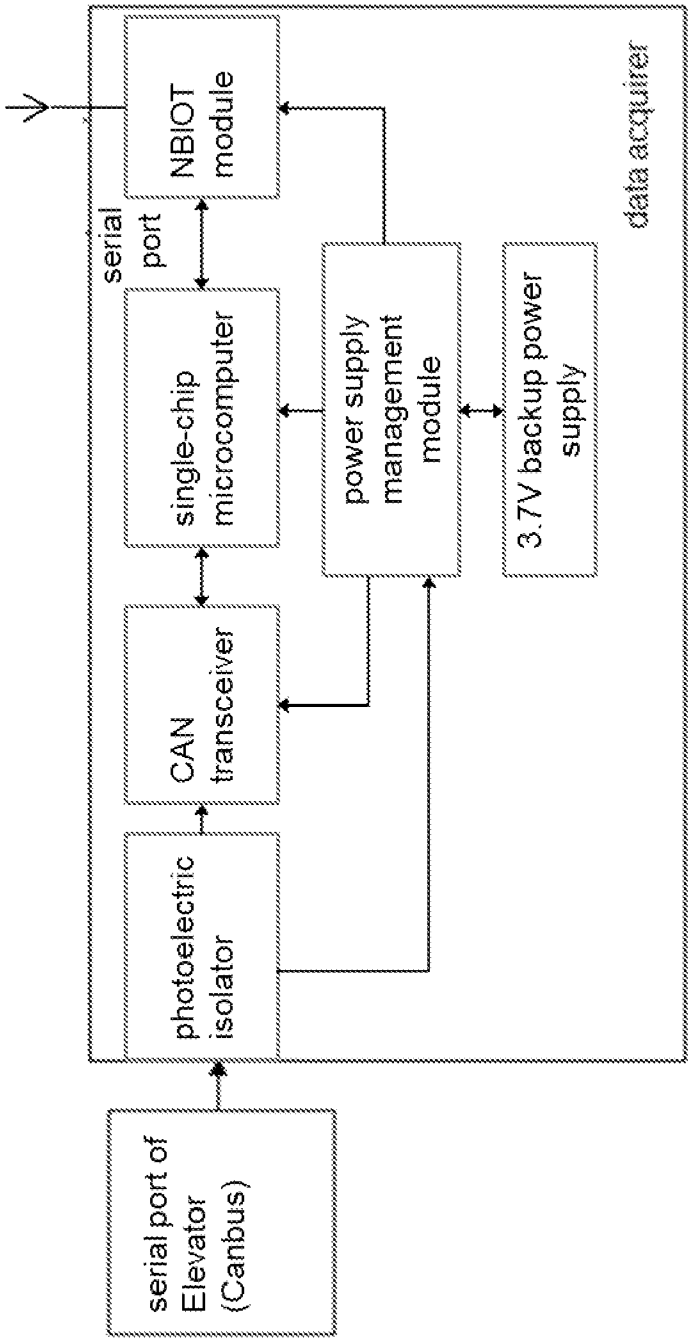
FIG. 4 is a schematic functional block diagram of a data acquirer of an apparatus for determining a fault of an elevator according to an embodiment of the present disclosure.

With reference to FIG. 4, the data acquirer includes a can transceiver, a microcontroller and an NBIOT module, wherein the can transceiver is called a controller area network transceiver, and the NBIOT module is called a narrowband IoT module.

The controller area network transceiver is electrically connected with an elevator controller, and configured to acquire a leveling signal and a signals of the leveling sensor from a serial port of the elevator controller, and the serial port is a controller area network bus. The single-chip microcomputer is electrically connected with the controller area network transceiver, and configured to acquire the leveling signal and the signals of the leveling sensor from the controller area network transceiver. The narrowband Internet of Things module is electrically connected with the single-chip microcomputer, and configured to acquire the leveling signal and the signals of the leveling sensor from the single-chip microcomputer and send the leveling signal and the signals of the leveling sensor to a predetermined terminal.

In this embodiment, the predetermined terminal is the data center described in the above embodiment, and the data center receives the leveling signal and the signals of the leveling sensor sent by the narrowband Internet module, such that the data of the leveling sensor is monitored in real time. The maintenance personnel may be prompted in time to perform intervention in advance once the abnormities in the signals are found.

The data acquirer further includes a power management module electrically connected with the controller area network transceiver, the single-chip microcomputer and the narrow-band Internet of Things module; a backup power supply electrically connected with the power management module; and a photoelectric isolator two ends of which are respectively connected with the controller area network transceiver and the serial port of the elevator.

In this embodiment, the voltage of the backup power supply is 3.7V. In order not to affect the normal operation of the elevator, the controller area network transceiver is connected with the Canbus interface of the elevator by adopting a photoelectric isolator, and the signals may only be output in one direction and may not be input. A faulty node is prevented from being added by the data acquirer and the original elevator system is prevented from being influenced, which reflects the characteristic of "only monitoring but not controlling" of the data acquirer.

The controller area network transceiver is configured to receive data of the Canbus serial interface of the elevator. The controller area network transceiver has a model SN65HVD230. The controller area network transceiver is suitable for serial communication of the can bus with high communication rate, good anti-interference ability and high reliability, and may be perfectly matched with the can bus used by the elevator and most of single-chip microcomputers.

The single-chip microcomputer has a model STM32L433Rx. The single-chip microcomputer is an ultra-low-power high-performance microprocessor (MCU), which is mainly applied in solutions for markets of wearable means, with the performance of an ARM Cortex-M4F core. The most important feature of the single-chip microcomputer is that it has seven low-power consumption modes, and further has a deep low-power consumption sub-mode, which maximizes the energy saving effect under various working conditions, and has a wealth of I/O interfaces and serial interfaces, which fully meets our design requirements.

The narrowband IoT module has a model BC35-G, which is controlled by employing an AT command through the serial port, may transmit data through mobile IOT docking, supports a deep coverage environment, and has a strong signal coverage.

One group of serial ports of the single-chip microcomputer is connected with the serial port of the elevator system through photoelectric coupling, as shown in FIG. 3, to receive the running data of the elevator. The other group of serial ports is connected with the narrow-band Internet of Things module to send the received data of the elevator, including inner call signals, door signals, running signals of the elevator, and induction signals of the leveling sensor, to the data center of the monitoring system in real time in the form of NBIOT for performing centralized processing.

The whole data acquirer is small in size, low in cost and easy to install. Installing one data acquirer (one node) for one elevator is capable of acquiring and transmitting the data of the elevator, which meets the application requirements.

In the several embodiments provided in the present disclosure, it should be understood that the apparatus and method disclosed may be implemented in other fashions. For example, the apparatus embodiments described above are only illustrative. For example, the division of the modules is only a logical function division. In an actual implementation, other division methods may exist. For example, multiple modules or components may be combined or may be integrated into another system, or some features may be ignored or not implemented. On the other hand, the shown or discussed mutual coupling or direct coupling or communication connection may be implemented through indirect coupling or communication connection of some interfaces, apparatuses or modules, and may be in electrical, mechanical or other forms.

The modules described as separate components may or may not be physically separated, and the components shown as modules may or may not be physical modules, that is, may be located in one place, or may be distributed to multiple network modules. Some or all of the modules may be selected according to actual needs to achieve the purpose of the solution in this embodiment.

In addition, each functional module in each embodiment of the present disclosure may be integrated into one processing module, or each module may exist physically alone, or two or more modules may be integrated into one module. The above-mentioned integrated modules may be implemented in the form of hardware, or may be implemented in the form of a software function module.

It should be noted that, for the convenience of description, the foregoing method embodiments are all expressed as a series of action combinations, but those skilled in the art should appreciate that the present disclosure is not limited by the described action sequence since certain steps may be performed in other orders or simultaneously according to the present disclosure. Further, those skilled in the art should further appreciate that the embodiments described in the specification are all preferred embodiments, and the actions and modules involved are not necessarily all necessary to the present disclosure.

In the above-mentioned embodiments, the description of each embodiment has its own emphasis. For parts that are not described in detail in a certain embodiment, reference may be made to the relevant descriptions of other embodiments.

The above is a description of the method and the apparatus for determining the fault of the apparatus provided by the present disclosure. For those skilled in the art, according to the idea of the embodiment of the present disclosure, changes in the detailed description and the application scope may exist. In summary, the contents of this specification should not be construed as limiting the present disclosure.

What is claimed is:

1. A method performed by an apparatus for determining a leveling fault of an elevator, wherein the apparatus comprises a data acquirer, a determining and calculating module, an acquiring module, a comparing module, and a determining module, the method comprising:

acquiring a leveling signal and a target floor signal of the elevator by the data acquirer, and determining whether the elevator is at a target floor according to the target floor signal by the determining and calculating module;

when yes, calculating a normal change sequence of signals of a leveling sensor of the elevator from a starting floor to the target floor by the determining and calculating module, wherein a change in the signals of the leveling sensor is a sequence of signal types consisting of non-induction signals, up induction signals, down induction signals and full-induction signals in a first direction and at rest, the normal change sequence comprises a first preset number of the non-induction signals, the up induction signals, the down induction signals and the full-induction signals in the first direction and one of the full-induction signals at rest, wherein the first preset number is the number of floors between the starting floor and the target floor, and the first direction is an up direction or a down direction of the elevator;

acquiring a real-time change sequence of the signals of the leveling sensor from the starting floor to the target floor by the acquiring module;

comparing whether the normal change sequence is the same as the real-time change sequence by the comparing module; and when the normal change sequence is the same as the real-time change sequence, determining that the elevator is normally leveled by the determining module, and when the normal change sequence is different from the real-time change sequence, determining that the elevator has a leveling fault by the determining module.

2. The method for determining the leveling fault of the elevator according to claim 1, further comprising:

after acquiring the leveling signal by the data acquirer, when a current floor where the elevator is located is not the target floor, determining whether a second preset number of the up induction signals, the full-induction signals and the down induction signals exist within the real-time change sequence of the signals of the leveling sensor between the starting floor and the current floor in the same direction by the determining and calculating module, wherein the second preset number is the number of floors between the starting floor and the current floor;

when yes, determining that the leveling sensor fails or a leveling baffle falls off by the determining module; and when not, continuing to acquire the leveling signal by the data acquirer.

3. The method for determining the leveling fault of the elevator according to claim 1, wherein after determining that the elevator has the leveling fault by the determining module, the method further comprises:

determining whether the first preset number of the up induction signals and the full-induction signals in the first direction and the one of the full-induction signals at rest exist within the real-time change sequence by the determining and calculating module; and when yes, determining that the leveling fault is a leveling non-stop fault by the determining module.

4. The method for determining the leveling fault of the elevator according to claim 1, wherein after determining that the elevator has the leveling fault by the determining module, the method further comprises:

determining whether more than the first preset number of the down induction signals and the full-induction signals in the first direction exist within the real-time change sequence, whether one of the down induction signals at rest exist within the real-time change sequence, and whether one of the full-induction signals in a direction opposite to the first direction exist within the real-time change sequence by the determining and calculating module; and when all are yes, determining that the leveling fault is a leveling dislocation fault by the determining module.

5. The method for determining the leveling fault of the elevator according to claim 1, wherein after determining that the elevator has the leveling fault by the determining module, the method further comprises:

determining whether the up induction signals are adjacent to the down induction signals in the real-time change sequence in the first direction by the determining and calculating module;

when yes, determining whether the up induction signals and the down induction signals reciprocate by the determining and calculating module; and when yes, determining that the leveling fault is a leveling-unable fault of an up-down cyclical movement of the elevator at the target floor by the determining module.

6. The method for determining the leveling fault of the elevator according to claim 1, wherein after determining that the elevator has the leveling fault by the determining module, the method further comprises:

determining in the real-time change sequence minus the signals of the leveling sensor of the target floor by the determining and calculating module, whether one of the up induction signals and one of the down induction signals in the real-time change sequence in the first direction are adjacent; and when yes, determining by the determining module that a leveling-unable fault of an up-down cyclical movement of the elevator exists in a floor corresponding to a location where the one of the up induction signals and the one of the down induction signals are adjacent.

7. The method for determining the leveling fault of the elevator according to claim 1, wherein after determining that the elevator has the leveling fault by the determining module, the method further comprises:

generating alarm information by the data acquirer, and sending the alarm information to a receiving terminal of elevator maintenance personnel.

8. An apparatus for determining a leveling fault of an elevator, comprising:

a data acquirer, configured to acquire a leveling signal and a target floor signal of an elevator;

a determining and calculating module, configured to determine whether the elevator is at a target floor, and when yes, calculate a normal change sequence of signals of a leveling sensor of the elevator from a starting floor to the target floor;

an acquiring module, configured to acquire a real-time change sequence of the signals of the leveling sensor from the starting floor to the target floor;

a comparing module, configured to compare whether the normal change sequence is the same as the real-time change sequence; and a determining module, configured to: determine that the elevator is normally leveled when the normal change sequence is the same as the real-time change sequence, and determine that the elevator has a leveling fault when the normal change sequence is different from the real-time change sequence.

9. The apparatus for determining the leveling fault of the elevator according to claim 8, wherein the data acquirer comprises:

a controller area network transceiver, a single-chip microcomputer and a narrowband Internet of Things module, wherein the controller area network transceiver is electrically connected with an elevator controller, and configured to acquire the leveling signal and the signals of the leveling sensor from a serial port of the elevator controller, wherein the serial port is a controller area network bus;

the single-chip microcomputer is electrically connected with the controller area network transceiver, and configured to acquire the leveling signal and the signals of the leveling sensor from the controller area network transceiver; and the narrowband Internet of Things module is electrically connected with the single-chip microcomputer, and configured to acquire the leveling signal and the signals of the leveling sensor from the single-chip microcomputer and send the leveling signal and the signals of the leveling sensor to a predetermined terminal separate from the apparatus.

10. The apparatus for determining the leveling fault of the elevator according to claim 8, wherein the data acquirer further comprises:

a power management module, electrically connected with the controller area network transceiver, the single-chip microcomputer and the narrow-band Internet of Things module;

a backup power supply, electrically connected with the power management module; and a photoelectric isolator having two ends respectively connected with the controller area network transceiver and the serial port of the elevator.

* * * * *